US010543873B2

(12) United States Patent
Geng et al.

(10) Patent No.: US 10,543,873 B2
(45) Date of Patent: Jan. 28, 2020

(54) FRONT CABIN FRAME ASSEMBLY (71) Applicant: Guangzhou Automobile Group Co., Ltd., Guangzhou, Guangdong Province (CN)

(72) Inventors: Furong Geng, Guangzhou (CN); Dong Chen, Guangzhou (CN); Huanquan Yuan, Guangzhou (CN); Chunfu Wu, Guangzhou (CN); Jinxiu Yang, Guangzhou (CN); Baowen Ye, Guangzhou (CN)

(73) Assignee: GUANGZHOU AUTOMOBILE GROUP CO., LTD., Guangzhou, Guangdong Province (CN)

( * ) Notice: Subject to any disclaimer, the term of this patent is extended or adjusted under 35 U.S.C. 154(b) by 0 days.

(21) Appl. No.: 15/744,731

(22) PCT Filed: Aug. 31, 2016

(86) PCT No.: PCT/CN2016/097569
§ 371 (c)(1),
(2) Date: Jan. 12, 2018

(87) PCT Pub. No.: WO2017/101513
PCT Pub. Date: Jun. 22, 2017

(65) Prior Publication Data
US 2018/0201326 A1 Jul. 19, 2018

(30) Foreign Application Priority Data
Dec. 16, 2015 (CN) .......................... 2015 1 0946358

(51) Int. Cl.
*B62D 25/08* (2006.01)
*B60R 19/34* (2006.01)
*B62D 21/15* (2006.01)

(52) U.S. Cl.
CPC ............ *B62D 25/082* (2013.01); *B60R 19/34* (2013.01); *B62D 21/152* (2013.01); *B62D 25/081* (2013.01)

(58) Field of Classification Search
CPC .................................................... B62D 25/082
(Continued)

(56) References Cited

U.S. PATENT DOCUMENTS 7,887,123 B2 * 2/2011 Honji ................... B62D 21/152
280/488
8,684,451 B1 * 4/2014 Park ....................... B62D 25/08
296/203.02
(Continued)

FOREIGN PATENT DOCUMENTS

CN      102358349 B      6/2013
CN      202987288 U      6/2013
(Continued)

*Primary Examiner* — Joseph D. Pape
(74) *Attorney, Agent, or Firm* — Cheng-Ju Chiang (57) ABSTRACT

A front cabin frame assembly includes a front beam front section, an upper side beam, a cowl reinforcement crossbeam, a cowl outer reinforcement and an A-pillar. A front end of the front beam front section is laterally connected with a front end of the upper side beam. A root portion of the front beam front section is connected with the cowl reinforcement crossbeam. A root portion of the upper side beam is connected with the A-pillar. The cowl outer reinforcement is connected with the root portion of the front beam front section and the A-pillar. The front cabin frame assembly could effectively absorb the head-on collision energy and has reasonable load transfer paths, which improves the flexural and torsion stiffness, the collision safety and NVH performance of the entire vehicle.

8 Claims, 7 Drawing Sheets

(58) Field of Classification Search
USPC ...... 296/203.02, 187.09, 187.1, 204, 193.07, 296/187.08
See application file for complete search history.

(56) References Cited

U.S. PATENT DOCUMENTS

| | | |
|---|---|---|
| 2004/0056515 A1 | 3/2004 | Nomura |
| 2004/0189055 A1* | 9/2004 | Tomita ................. B62D 25/082 296/203.02 |
| 2011/0133518 A1* | 6/2011 | Wanke ................... B62D 25/20 296/203.02 |
| 2014/0291053 A1* | 10/2014 | Nagasawa ............ B62D 25/084 180/271 |
| 2015/0061320 A1* | 3/2015 | Yabu ....................... B60R 19/18 296/187.1 |

FOREIGN PATENT DOCUMENTS

| | | |
|---|---|---|
| CN | 103373396 A | 10/2013 |
| CN | 203306103 U | 11/2013 |
| CN | 203358689 U | 12/2013 |
| CN | 103770841 A | 5/2014 |
| CN | 203637949 U | 6/2014 |
| CN | 204415518 U | 6/2015 |
| CN | 204623579 U | 9/2015 |
| CN | 204775483 U | 11/2015 |
| CN | 204821716 U | 12/2015 |
| CN | 205273623 U | 6/2016 |
| JP | H7-228267 A | 8/1995 |
| WO | 2008/102262 A1 | 8/2008 |

\* cited by examiner

FRONT CABIN FRAME ASSEMBLY

CROSS REFERENCE TO RELATED APPLICATIONS

This application is a 35 U.S.C. § 371 National Phase conversion of International (PCT) Patent Application No. PCT/CN2016/097569, filed on Aug. 31, 2016, which claims priority of Chinese Patent Application No. 201510946358.8, filed by Guangzhou Automobile Group Co., Ltd. on Dec. 16, 2015, and entitled as "front cabin frame assembly". The entire disclosure of the above-identified application is incorporated herein by reference. The PCT International Patent Application was filed and published in Chinese.

FIELD OF THE INVENTION

The present invention relates to the field of vehicle body structure, and more particularly to a front cabin frame assembly.

BACKGROUND OF THE INVENTION

As main structure of a vehicle body to endure head-on collision, front cabin must have the ability of absorbing collision energy, distributing and transferring impact force effectively through reasonable deformation, so as to protect the passenger compartment. In addition, the front cabin should have sufficient flexural and torsional stiffness and good NVH (Noise, Vibration and Harshness) performance. At present, the common front cabin frame is composed of front bumper, left and right front beams, front reinforcement structure and A-pillar. However, this structure does not have enough load transfer path and the load transfer path of this structure is insufficient and discontinuous. Furthermore, there is not reasonable lateral connection structure between the longitudinal beams. When the vehicle body is subject to a head-on collision, the front cabin will not be able to absorb and dissipate the collision energy effectively, result a large amount of invasion in the dash panel and a large amount of deformation of the floor and the middle channel, and further cause a great damage to the passengers in the passenger compartment and affect the collision safety of the entire vehicle. On the other hand, the flexural and torsional stiffness of the vehicle body is not good enough due to the structure does not have reasonable continuously connected structure. This is not benefit for the improvement of the vehicle NVH performance.

SUMMARY OF THE INVENTION

The present invention provides a front cabin frame assembly which has reasonable load transfer path and could absorb and dissipate the collision energy effectively when subject to a head-on collision, and effectively increases the flexural and torsional stiffness of the entire vehicle and improves the collision safety and the vehicle NVH performance.

The front cabin frame assembly of the present invention includes a front beam front section, an upper side beam, a cowl reinforcement crossbeam, a cowl outer reinforcement and an A-pillar. A front end of the front beam front section is laterally connected with a front end of the upper side beam. A root portion of the front beam front section is connected with the cowl reinforcement crossbeam. A root portion of the upper side beam is connected with the A-pillar. The cowl outer reinforcement is connected with the root portion of the front beam front section and the A-pillar.

According to an embodiment of the present invention, the front cabin frame assembly further includes an energy absorbing box disposed in the front of the front beam front section and a bumper beam disposed in the front of the energy absorbing box. The bumper beam, the energy absorbing box, the front beam front section and the cowl reinforcement crossbeam cooperatively form a frame having a shape of "☐".

According to an embodiment of the present invention, the upper side beam is located at outer side of the front beam front section along a width direction of a vehicle body. The frontmost end of the upper side beam extends beyond a rear end of the energy absorbing box.

According to an embodiment of the present invention, the upper side beam includes a first portion, a second portion and a third portion. The first portion is connected with the front beam front section, the third portion is connected with the A-pillar, the second portion connects the first portion with the third portion and is configured in arc shape. A height of the first portion is lower than a height of the third portion.

According to an embodiment of the present invention, a front end of the second portion is connected with a front end of the front beam front section through a front headlamp crossbeam and a front module mounting pillar, a front end of the first portion is connected with the front end of front beam front section through a front beam connection bracket. A height of the front end of the first portion is higher than a height of the front beam front section along a height direction of a vehicle body.

According to an embodiment of the present invention, the front cabin frame assembly further includes a drip rail and a front tower disposed between the front beam front section and the upper side beam. An upper portion of the front tower is connected with two opposite ends of the drip rail. The front beam connection bracket, the front tower, the front beam front section and the upper side beam cooperatively form a frame having a shape of "☐".

According to an embodiment of the present invention, the frontmost of the first portion disposes a covering plate, and a lower part of a middle portion of the second portion disposes a plurality of energy absorbing ribs.

According to an embodiment of the present invention, a transverse area of the third portion gradually increases from an end connected with the second portion towards an end connected with the A-pillar. The third portion and the A-pillar connect to a continuously connected structure.

According to an embodiment of the present invention, the yield strength of the first portion, the second portion and the third portion increases gradually.

According to an embodiment of the present invention, the front cabin frame assembly further includes a front beam rear section, an outer connection bracket, an inner connection bracket and a middle channel side beam. The front beam rear section is connected with the root portion of the front beam front section, the outer connection bracket is connected with the front beam rear section and the A-pillar, the inner connection bracket is connected with the front beam rear section and the middle channel side beam.

According to an embodiment of the present invention, the front cabin frame assembly further includes a middle channel and a windshield crossbeam disposed above the cowl reinforcement crossbeam. The windshield crossbeam, the A-pillar, the cowl reinforcement crossbeam and the cowl outer reinforcement cooperatively form a frame having a shape of "☐". A middle portion of the cowl reinforcement crossbeam is connected with the middle channel and the middle channel side beam to form a continuously connected structure.

In embodiments of the present invention, the front end of the upper side beam is connected with the front end of the front beam front section through the front beam connection bracket, the root portion of the front beam front section is connected with the cowl reinforcement crossbeam, the root portion of the upper side beam is connected with the A-pillar, thereby forming two longitudinal load transfer paths. The two longitudinal load transfer paths are designed to include a plurality of continuously connected overlapping crossbeams, thereby forming an enclosed ring-like front cabin frame. Therefore, the collision energy could be transferred along two paths and by the upper side beam and the front beam when the vehicle body is subject to a head-on collision. Furthermore, the collision energy is absorbed and transferred by a plurality of longitudinal beams and a plurality of lateral beams, which results the head-on collision energy be absorbed effectively and the load transfer path be more reasonable, thereby decreasing the deformation of the passenger compartment and the injury of the passengers, and increasing the collision safety of the entire vehicle. Meanwhile, the enclosed ring-like front cabin frame includes a plurality of continuously connected overlapping beams along lateral and longitudinal directions, which improves the flexural and torsional stiffness of the vehicle body and further improves the NVH performance.

DETAILED DESCRIPTION OF PREFERRED EMBODIMENTS

In order to further illustrate the techniques and effect of the present invention adopted for achieving predetermined invention purpose, exemplary embodiments, structures, features and the effects of the present invention will be described thoroughly in conjunction with the accompanying drawings and the preferred embodiments.

Referring to FIG.1 to FIG. 4, the front cabin frame assembly of an embodiment of the present invention includes a bumper beam 10, two energy absorbing boxes 20, two front beam front sections 30, two upper side beams 40, two front beam connection brackets 50, two front headlamp crossbeams 60, two front module mounting pillars 70, a cowl reinforcement crossbeam 80, two cowl outer reinforcements 90, a front tower 100, two A-pillars 110, two front beam rear sections 120, two outer connection brackets 130, two inner connection brackets 140, a windshield crossbeam 150, a drip rail 160, a middle channel 170 and two middle channel side beams 180.

Figure 1:
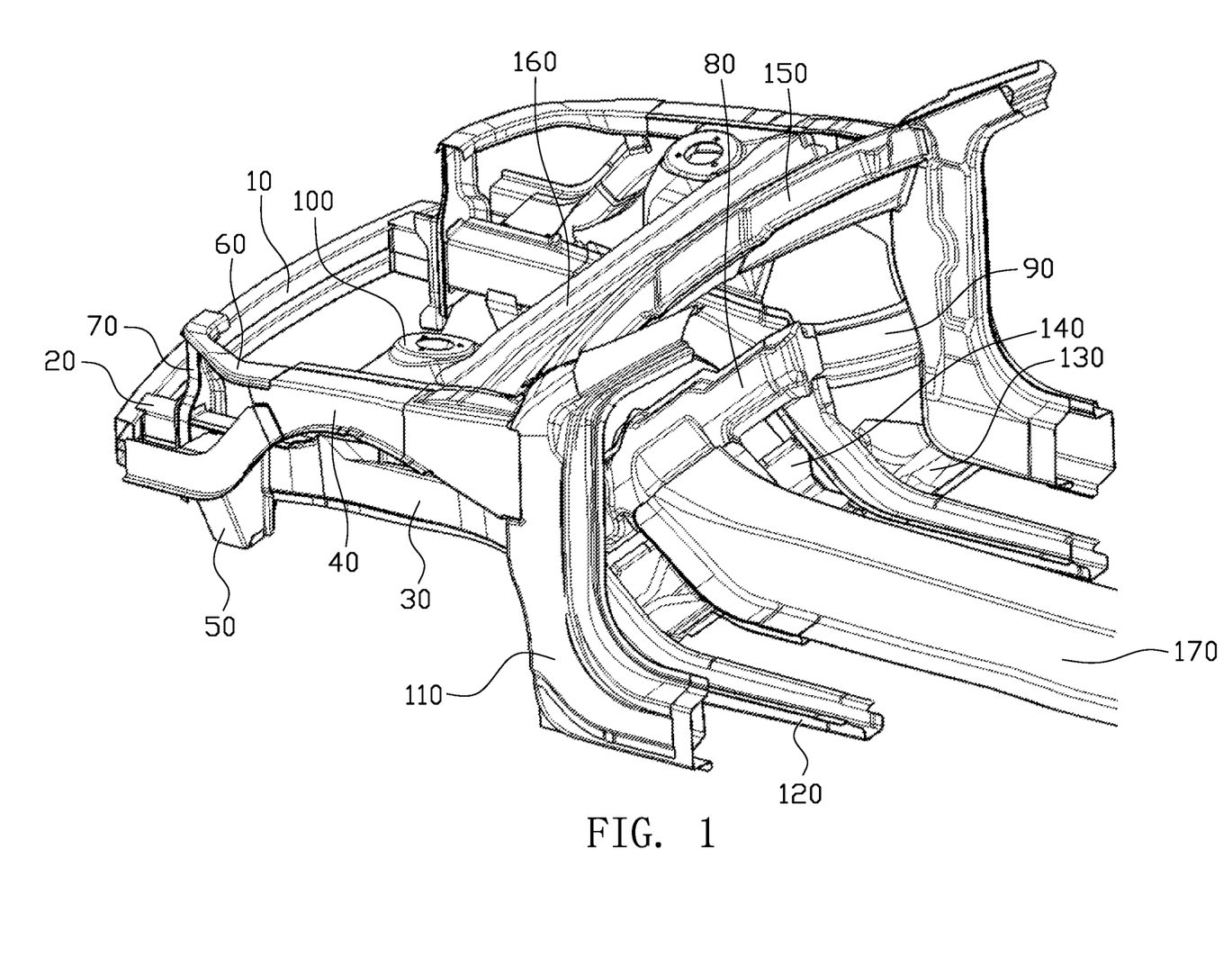
FIG. 1 is a schematic, three-dimensional view of a front cabin frame assembly according to an embodiment of the present invention.
Figure 2:
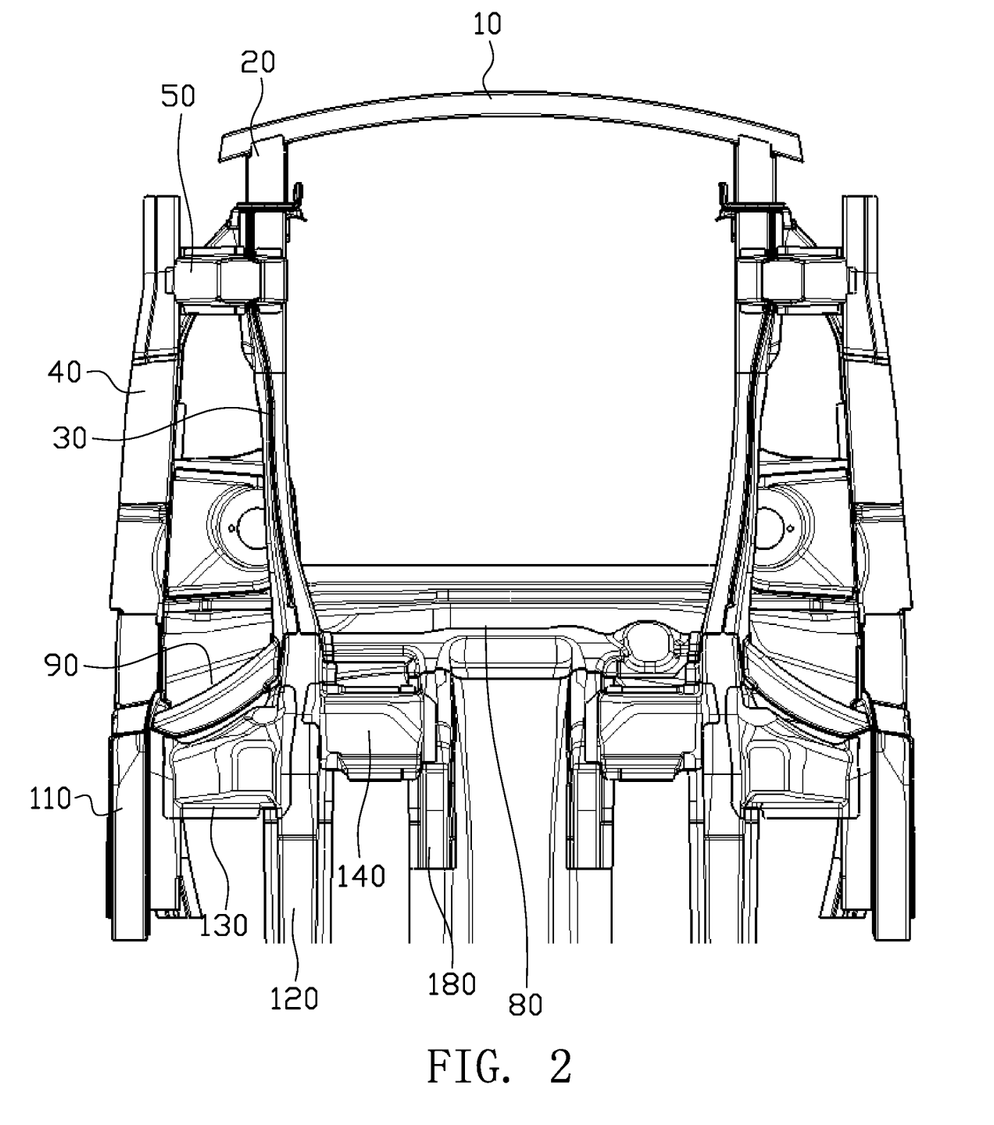
FIG. 2 is a schematic, bottom view of the front cabin frame assembly of FIG. 1.

Referring to FIG. 1 and FIG. 2, the bumper beam 10 is disposed in front of the energy absorbing boxes 20, and the energy absorbing boxes 20 are disposed in front of the front beam front sections 30. The energy absorbing boxes 20 are disposed at two opposite ends of the bumper beam 10 and threadedly connected with front ends of the front beam front sections 30. The front beam front section 30 extends along a length direction (longitudinal direction) of the vehicle body, and the cowl reinforcement crossbeam 80 extends along a width direction (lateral direction) of the vehicle body. Two opposite ends of the cowl reinforcement crossbeam 80 are connected with root portions of the front beam front sections 30 respectively. The bumper beam 10, the energy absorbing boxes 20, the front beam front sections 30 and the front beam reinforcement crossbeam 80 cooperatively connected to form an enclosed frame having a shape of "□". This stable structure is capable of improving collision performance, the flexural and torsional stiffness and the NVH performance of the front cabin.

Figure 3:
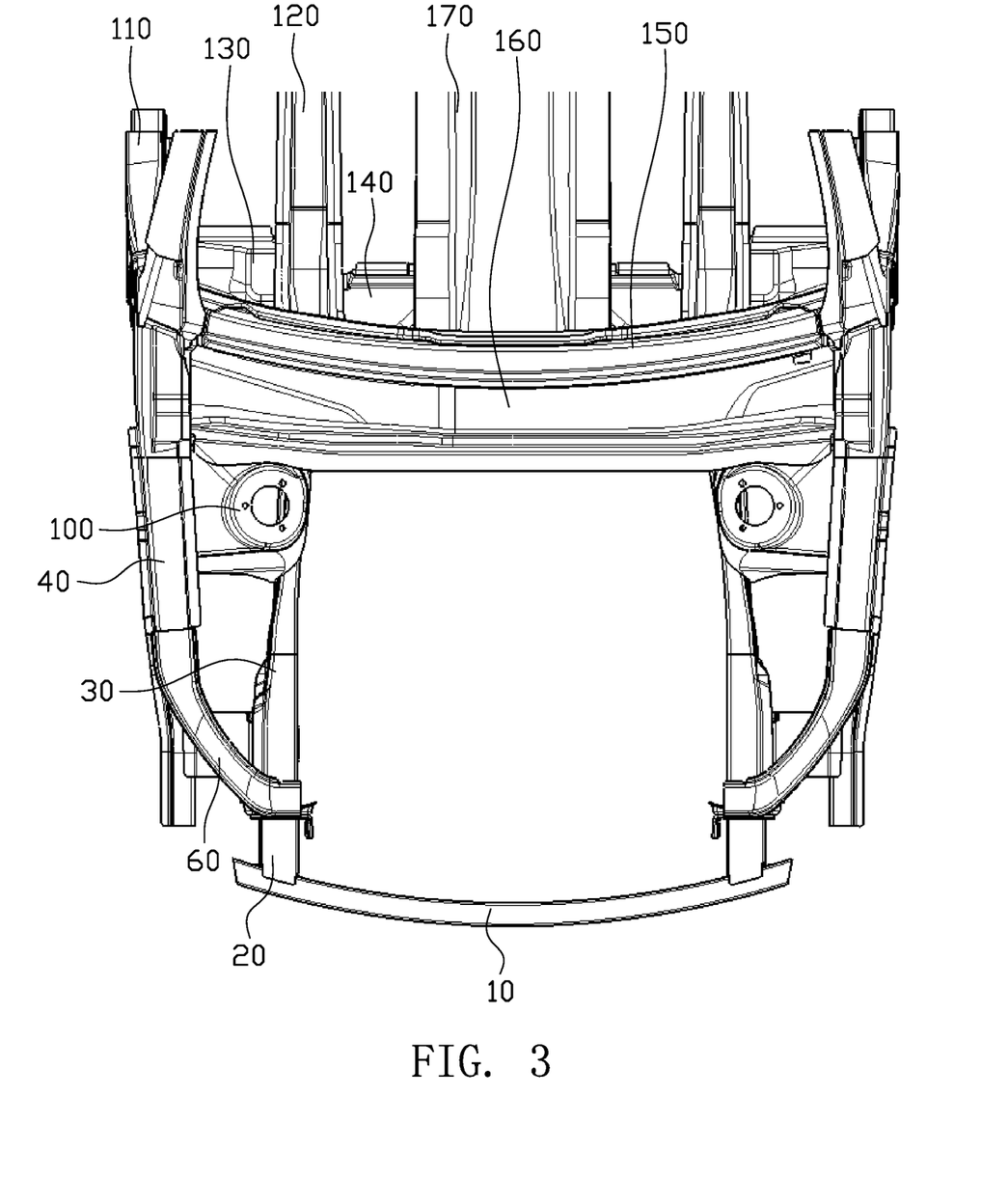
FIG. 3 is a schematic, top view of the front cabin frame assembly of FIG. 1.

Referring to FIG. 1 to FIG. 3, the upper side beams 40 are disposed at outer sides of the front beam front sections 30 along the width direction of the vehicle body. Front ends of the upper side beams 40 are connected with the front ends of the front beam front sections 30 through the front beam connection brackets 50. Root portions of the upper side beams 40 are connected with the A-pillars 110. In an embodiment of the present invention, the front ends of the front beam front sections 30 are connected with the front ends of the upper side beams 40 through the front beam connection brackets 50, the root portions of the front beam front sections 30 are connected with the cowl reinforcement crossbeams 80, and the root portions of the upper side beams 40 are connected with the A-pillars 110, thereby providing two load transfer paths along the length direction of the vehicle body, that is to say, the impact force could be transferred along the front beam front section 30 and the upper side beam 40, and the collision energy could be absorbed and distributed effectively.

Figure 4:
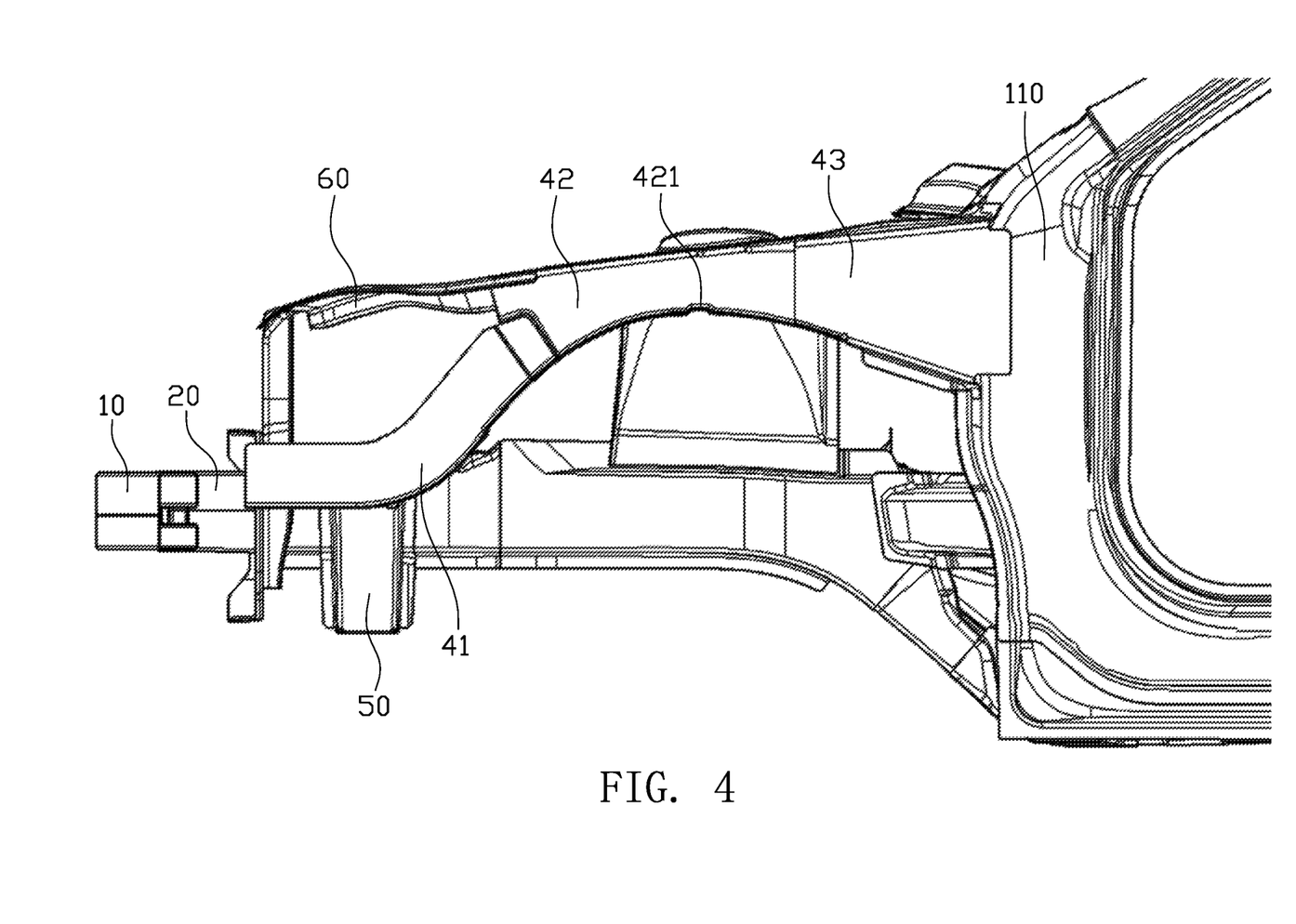
FIG. 4 is a schematic, side view of the front cabin frame assembly of FIG. 1.

More concretely, accompanying with FIG. 4, the upper side beam 40 includes a first portion 41, a second portion 42 and a third portion 43. The first portion 41 is connected with the front end of the front beam front section 30, and the third portion 43 is connected with an upper portion of the A-pillar 110. A height of the first portion 41 is lower than a height of the third portion 43, this is because under the consideration of layout space requirement such as avoid the headlamp, the smaller the height difference between the first portion 41 and the third portion 43 is, the better the collision performance of the upper beam 40 is, due to the load transfer path along the upper side beam 40 is more straight. The second portion 42 connects the first portion 41 with the third portion 43 and is configured in arc shape. The arc-shaped configuration of the second portion 42 could avoid tire envelope and extend load absorb and transfer path, so that the upper side beam 40 could absorb and transfer the collision energy more effectively. In addition, the three portions of the upper side beam 40 could be arranged in different materials, for example, the first portion 41 and the second portion 42 are made of high-strength steel with a lower yield strength, while the third portion 43 is made of high-strength steel with a higher yield strength, thereby making the yield strength of the first portion 41, the second portion 42 and the third portion 43 increases gradually, and further making the entire structure of the upper side beam 40 be soft in front and hard in back, and weak in front and strong in back, so that the front portion of the upper side beam 40 could fully collapse and effectively absorb collision energy, making the rear portion of the upper side beam 40 could dissipate and transfer the rest of the collision energy effectively.

Furthermore, the height of the front end of the first portion 41 is higher than a height of the front end of the front beam front section 30 along a height direction of the vehicle body. Moreover, the forefront of the first portion 41, i.e., the forefront of the upper side beam 40 extends forwardly beyond the rear end of the energy absorbing box 20 (i.e., the forefront of the upper side beam 40 locates slightly in front of the rear end of the energy absorbing box 20). Due to the forefront of the upper side beam 40 extends forwardly beyond the rear end of the energy absorbing box 20, the obstacle could contact with the upper side beam 40 as it contacts with the front end of the front beam front section 30 in the case that the bumper beam 10 and the energy absorbing box 20 already collapsed and absorbed the collision energy effectively, so that the collision energy could be dissipated and transferred promptly and effectively. Due to the height of the front end of the first portion 41 is higher than the height of the front end of the front beam front section 30 along the height direction of the vehicle body, the collision energy could be transferred to the front end of the front beam front section 30 and the upper side beam 40, meanwhile, the height difference of two opposite ends of the upper side beam 40 is decreased, and a perfect energy absorb and transfer effect is obtained. Moreover, a covering plate 411 is disposed at the forefront of the first portion 41, which prevents the obstacle from invading in an inner compartment of the upper side beam 40 and reducing the energy absorb and transfer effect of the front end of the upper side beam 40.

In addition, in this embodiment, a plurality of energy absorbing ribs 421 are disposed at a lower part of a middle portion of the second portion 42 to benefit the first portion 41 and the second portion 42 of the upper side beam 40 to fully collapse and effectively absorb the collision energy, and decrease the impact of the rear portion of the upper side beam 40 (i.e., the third portion 43) on the A-pillar 110. Meanwhile, the transverse area of the third portion 43 gradually increases from an end connected with the second portion 42 towards an end connected with the A-pillar 110, thereby forming a compartment between the third portion 43 and the A-pillar 110, which facilitates to dissipate the collision energy to the top end and the bottom end of the A-pillar 110 and further transfer the energy to a top portion and a bottom portion of the side wall of the vehicle body. In the embodiment, a width of the upper side beam 40 substantially equals to a width of the A-pillar 110 along the width direction of the vehicle body, which prevents a curved structure being formed between the upper side beam 40 and the A-pillar 110, and further ensures the collision energy be transferred along a straight line.

Figure 5:
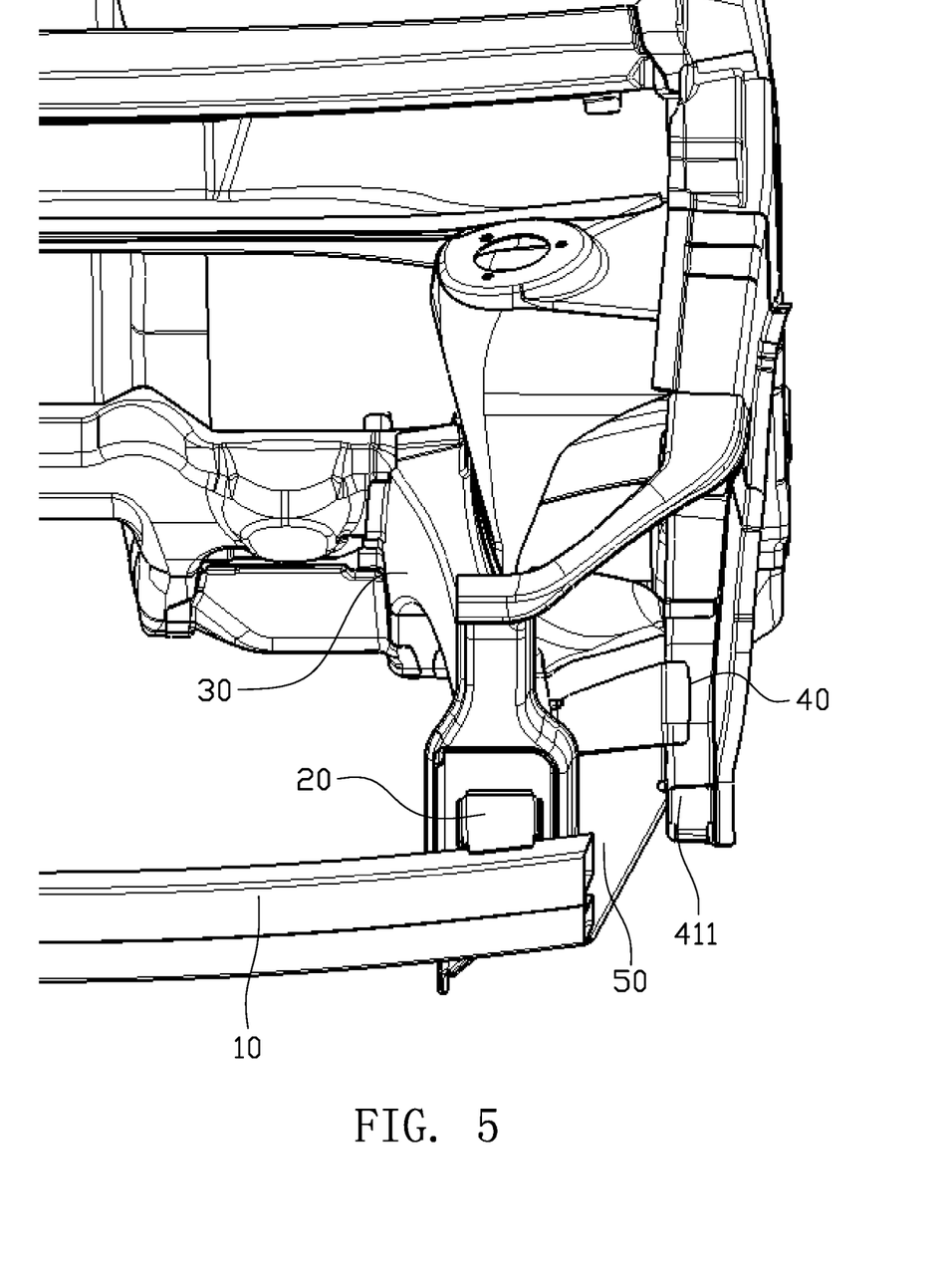
FIG. 5 is a schematic, three-dimensional view of some parts of the front cabin frame assembly of FIG. 1.

Moreover, accompany referring to FIG. 5, the front end of the first portion 41 is laterally connected with the front end of the front beam front section 30 through the front beam connection bracket 50, the front end of the second portion 42 is connected with the front end of the front beam front section 30 through the front headlamp crossbeam 60 and the front module mounting pillar 70, and a middle rear end of the second portion 42 is connected with a middle portion of the front beam front section 30 through the front tower 100, thereby forming a frame having a shape of "| |", which obviously improves the performance of 25% offset collision, and further increases the flexural and torsional stiffness of the vehicle body and improves the NVH performance.

Referring back to FIG. 1 and FIG. 2, the windshield crossbeam 150 is disposed above the frame of the dash panel with left and right ends thereof connected with the A-pillar 10, and the cowl reinforcement crossbeam 80 is disposed below the frame of the dash panel and connected with the A-pillar 110, thereby forming two continuously connected reinforcement structures along lateral direction. The cowl outer reinforcements 90, the cowl reinforcement crossbeam 80, the windshield crossbeam 150 and the A-pillars 110 cooperatively form a continuously connected structure along the width direction of the vehicle body, i.e., the windshield crossbeam 150, the A-pillars 110, the cowl reinforcement crossbeam 80 and the cowl outer reinforcements 90 cooperatively form a frame having a shape of "□", which further improves the capabilities of resisting flex and torsion under external load, thereby increasing the flexural and torsional stiffness as well as improving the flex and torsion mode of the vehicle body, and further improving the NVH performance.

The front beam rear section 120 is connected with the root portion of the front beam front section 30 and extends along the length direction of the vehicle body. The outer connection bracket 130 connects the front beam rear section 120 with the A-pillar 110. The inner connection bracket 140 connects the front beam rear section 120 with the middle channel side beam 180. In the embodiment, the outer connection bracket 130 and the inner connection bracket 140 are disposed at two opposite sides of a position of the front beam rear section 120, which is disposed adjacent to the root portion of the front beam front section 30 along a length direction of the front beam rear section 120, so that the front beam rear section 120, the outer connection bracket 130, and the inner connection bracket 140 cooperatively form a continuous overlapping structure along the width direction of the vehicle body, which improves the capabilities of resisting flex and torsion under external load as well, and is capable of dissipating the collision energy on the subframe from the front beam rear section 120 to the doorsill (not shown in Figures) and the middle channel side beam 180 when the vehicle is subject to a head-on collision, thereby increasing strength of subframe installation points on the frame. In addition, the middle portion of the cowl reinforcement crossbeam 80 connects with the middle channel 170 and the middle channel side beam 180 to form a continuously connected structure, which could effectively dissipate the collision energy and improve local mode of the front portion of the middle channel 170 and further increases the flexural and torsional stiffness of the entire vehicle.

The operating theory of the front cabin frame assembly in head-on collision is described as follow.

Figure 6:
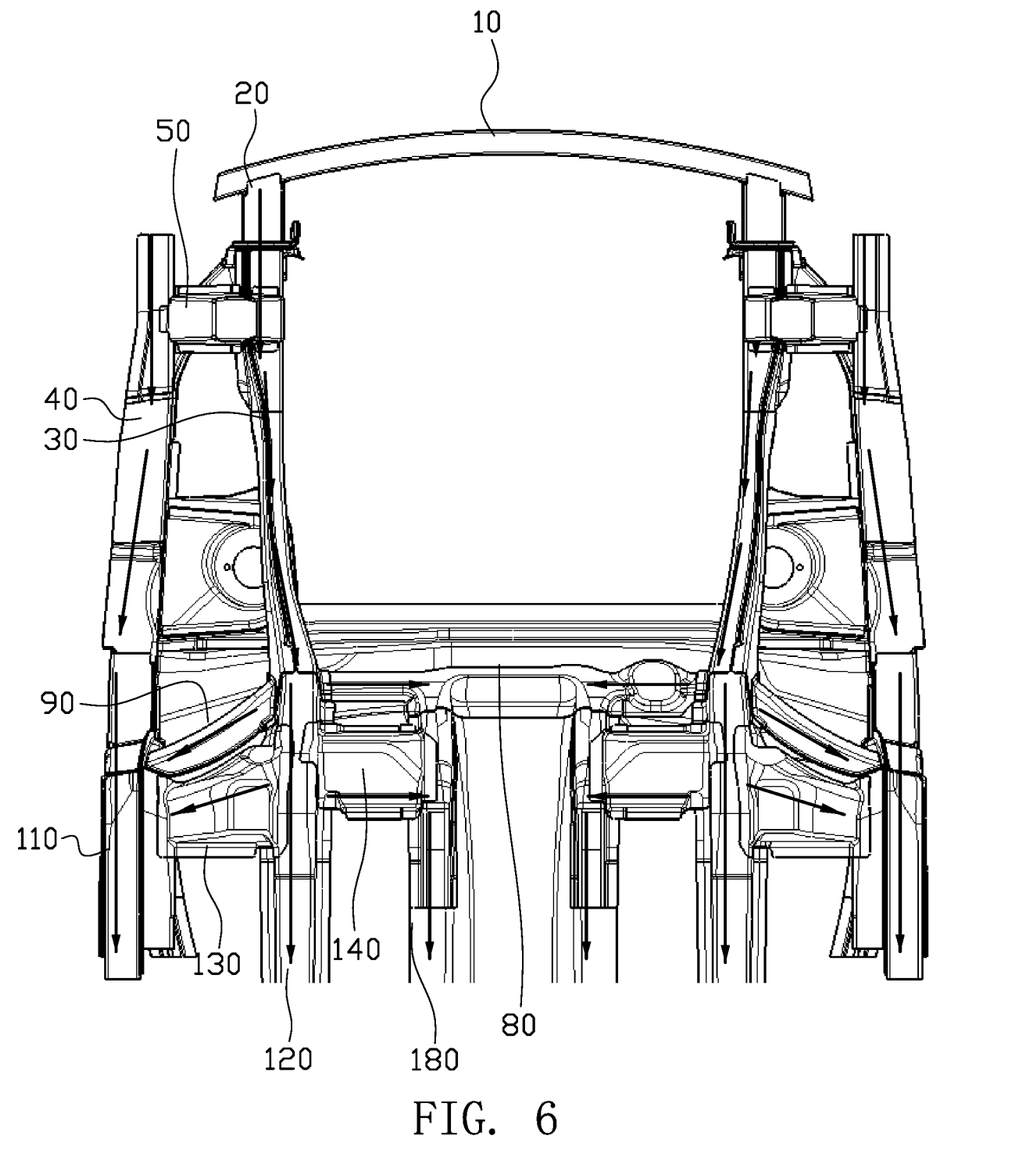
FIG. 6 is a schematic, bottom view of load transfer paths of the front cabin frame assembly of FIG. 1 when subject to a head-on collision.
Figure 7:
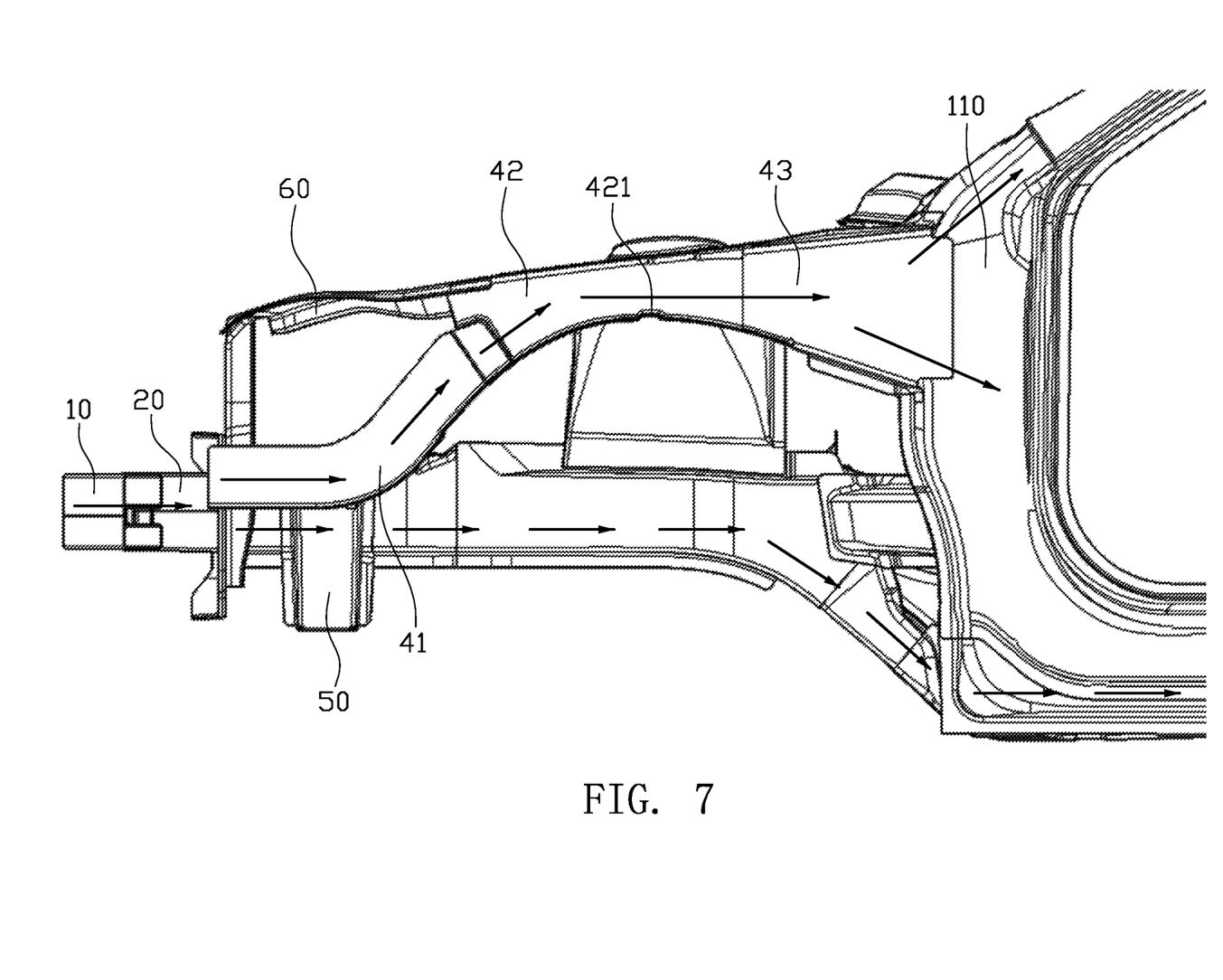
FIG. 7 is a schematic, side view of load transfer paths of the front cabin frame assembly of FIG. 1 when subject to a head-on collision.

Referring to FIG. 6 and FIG. 7, when the vehicle body is subject to a head-on collision, the obstacle impacts the bummer beam 10 firstly, the bumper beam 10 transfers the impact force to the energy absorbing box 20 and the front end of the front beam front section 30, furthermore, when the bumper beam 10 and the energy absorbing box 20 fully collapse and effectively absorb the collision energy, the obstacle contacts with the front end of the front beam front section 30 as well as the front end of the upper beam section 40, and the impact force on the front beam front section 30 and the upper side beam 40 could be dissipated through the front beam connection bracket 50, the front headlamp crossbeam 60 and the front module mounting pillar 70, so that the impact force could be dissipated in the longitudinal direction of the vehicle body to beams at the rear portion of the front cabin frame assembly by two load transfer paths (indicated by the arrows shown in FIG. 6) and along the front beam front section 30 and the upper side beam 40. The load transfer manner makes the impact force could be transferred by the entire frame structure of the front cabin, thereby preventing a single beam from becoming instability due to suffer excessive impact load. Meanwhile, in the present invention, the longitudinal beams are connected laterally through the cowl reinforcement crossbeam 80, the cowl reinforcement 90, the outer connection bracket 130 and the inner connection bracket 140, so that the impact force could be dissipated laterally (indicated by the arrows shown in FIG. 6) towards the cowl reinforcement crossbeam 80, the dash panel (not shown in Figures), the middle channel 170 and the middle channel side beam 180 as the impact force is dissipated backwards along the front beam front section 30 and the upper side beam 40, therefore, the collision energy could be dissipated to each region effectively, accordingly decreases the invasion rate in the passenger compartment effectively and ensures the safety of the passenger. On the other hand, the structure that the transverse area of the third portion 43 of the upper side beam 40 varies could dissipate the collision energy effectively towards the top end and the bottom end of the A-pillar 110 (indicated by the arrows shown in FIG. 7) and further towards the top and the bottom portions of the side wall so that the impact force is further dissipated and the collision energy is distributed along two load transfer paths reasonably, which makes the load transfer path be more sufficient and improves the collision safety of the entire vehicle.

As mentioned above, the front cabin frame assembly of the present invention includes the following advantages.

(1) The front cabin frame assembly of the present invention includes two load transfer paths for transferring collision energy, makes the front cabin frame could absorb the head-on collision energy effectively and results the load transfer path be more reasonable, thereby decreasing the injury of the passengers during collision, and increasing the collision safety of the entire vehicle.

(2) The frontmost of the first portion of the upper side beam disposes a covering plate, the second portion disposes a plurality of energy absorbing ribs and is configured to arc shape which slightly bends upward, the third portion is configured to a structure with the transverse area thereof gradually increases, and the upper side beam is configured to soft in front and hard in back, and weak in front and strong in back, therefore could absorb and dissipate the collision energy effectively, and accordingly improve the collision performance of the front portion of the vehicle body, especially improve the performance of 25% offset collision.

(3) The front cabin frame assembly of the present invention includes a plurality of enclosed structures having a shape of "□" and a plurality of continuously connected overlapping structures along lateral and longitudinal directions, which could improve the flexural and torsional stiffness and the mode of the vehicle body and further improves the NVH performance.

The descriptions above are embodiments of the present invention only and are not used, by any way, to limit the present invention. Although the present invention has been described with reference to the above embodiments, those embodiments are not used to limit the present invention, it will be apparent to anyone of ordinary skill in the art that slight changes or modifications to the described embodiments may be made to become equivalent embodiments without departing from the technique scope of the present invention. On the contrary, any slight and simple changes, equivalent variations and modifications according to the spirit of the present invention should fall within the technique scope of the present invention.

INDUSTRIAL APPLICABILITY

In the present invention, the front end of the upper side beam is connected with the front end of the front beam front section through the front beam connection bracket, the root portion of the front beam front section is connected with the cowl reinforcement crossbeam, the root portion of the upper side beam is connected with the A-pillar, thereby forming two longitudinal load transfer paths. The two longitudinal load transfer paths are designed to include a plurality of continuously connected overlapping crossbeams, thereby forming an enclosed ring-like front cabin frame. Therefore, the collision energy could be transferred along two paths and by the upper side beam and the front beam when the vehicle body is subject to a head-on collision. Furthermore, the collision energy is absorbed and transferred by a plurality of longitudinal beams and a plurality of lateral beams, which results the head-on collision energy be absorbed effectively and the load transfer path be more reasonable, thereby decreasing the deformation of the passenger compartment and the injury of the passengers, and increasing the collision safety of the entire vehicle. Meanwhile, the enclosed ring-like front cabin frame includes a plurality of continuously connected overlapping beams along lateral and longitudinal directions, which improves the flexural and torsional stiffness of the vehicle body and further improves the NVH performance.

What is claimed is:

1. A front cabin frame assembly, comprising: a pair of energy absorbing boxes, a pair of front beam front sections, a pair of upper side beams, a cowl reinforcement crossbeam, a pair of cowl outer reinforcements and a pair of A-pillars, the energy absorbing boxes being disposed in front of the front beam front sections, front ends of the front beam front sections laterally connected with front ends of the upper side beams, root portions of the front beam front sections connected with the cowl reinforcement crossbeam, root portions of the upper side beams connected with the A-pillars, the cowl outer reinforcements connected with the root portions of the front beam front sections and the A-pillars, the upper side beams being disposed at outer sides of the front beam front sections according to a width direction of a vehicle body, outer sidewalls of the front beam front sections laterally connecting with inner sidewalls of the upper side beams by a pair of front beam connection brackets, forefronts of the upper side beams extending forwardly beyond rear ends of the energy absorbing boxes, wherein the upper side beam comprises a first portion, a second portion and a third portion, the first portion is connected with the front beam front section, the third portion is connected with the A-pillar, the second portion connects the first portion with the third portion and is configured in a shape of curve, a height of the first portion is lower than a height of the third portion, the forefront of the first portion disposes a covering plate, and a lower part of a middle portion of the second portion disposes a plurality of energy absorbing ribs, the energy absorbing ribs are indents formed on a lower surface of the second portion.

2. The front cabin frame assembly according to claim 1, wherein the front cabin frame assembly further comprises a bumper beam disposed in front of the energy absorbing boxes, the bumper beam, the energy absorbing boxes, the front beam front sections and the cowl reinforcement crossbeam cooperatively form a frame having quadrangle shape.

3. The front cabin frame assembly according to claim 1, wherein a front end of the second portion is connected with a front end of the front beam front section through a front headlamp crossbeam and a front module mounting pillar, a height of the front end of the first portion is higher than a height of the front beam front section along a height direction of a vehicle body.

4. The front cabin frame assembly according to claim 3, wherein the front cabin frame assembly further comprises a drip rail and a pair of front towers disposed between the front beam front sections and the upper side beams, upper portions of the front towers are connected with two opposite ends of the drip rail, the front beam connection brackets, the front towers, the front beam front sections and the upper side beams cooperatively form a frame having quadrangle shape.

5. The front cabin frame assembly according to claim 1, wherein a transverse area of the third portion gradually increases from an end connected with the second portion towards an end connected with the A-pillar.

6. The front cabin frame assembly according to claim 1, wherein the yield strength of the first portion, the second portion and the third portion increases gradually.

7. The front cabin frame assembly according to claim 1, wherein the front cabin frame assembly further comprises a pair of front beam rear sections, a pair of outer connection brackets, a pair of inner connection brackets and a pair of middle channel side beams, the front beam rear sections are connected with the root portions of the front beam front sections, the outer connection brackets are connected with the front beam rear sections and the A-pillars, the inner connection brackets are connected with the front beam rear sections and the middle channel side beams.

8. The front cabin frame assembly according to claim 7, wherein the front cabin frame assembly further comprises a middle channel and a windshield crossbeam disposed above the cowl reinforcement crossbeam, the windshield crossbeam, the A-pillars, the cowl reinforcement crossbeam and the cowl outer reinforcements cooperatively form a frame having quadrangle shape, a middle portion of the cowl reinforcement crossbeam is connected with the middle channel and the middle channel side beam to form a continuously connected structure.

\* \* \* \* \*